United States Patent
LaForge

(12) 
(10) Patent No.: US 9,028,116 B2
(45) Date of Patent: May 12, 2015

(54) LUMINAIRE BARRIER OR CLOSURE DEVICE

(76) Inventor: Joseph Roy LaForge, St. Thomas (CA)

( * ) Notice: Subject to any disclaimer, the term of this patent is extended or adjusted under 35 U.S.C. 154(b) by 1013 days.

(21) Appl. No.: 12/780,266

(22) Filed: May 14, 2010

(65) Prior Publication Data

US 2010/0288206 A1    Nov. 18, 2010

Related U.S. Application Data

(60) Provisional application No. 61/213,187, filed on May 15, 2009.

(51) Int. Cl.
| | |
|---|---|
| F21V 17/00 | (2006.01) |
| F21V 15/00 | (2006.01) |
| A01M 7/00 | (2006.01) |
| A01M 29/30 | (2011.01) |
| A01M 29/32 | (2011.01) |
| A01M 29/34 | (2011.01) |
| B29K 23/00 | (2006.01) |

(52) U.S. Cl.
CPC .................. *F21V 15/00* (2013.01); *A01M 7/00* (2013.01); *A01M 29/30* (2013.01); *A01M 29/32* (2013.01); *A01M 29/34* (2013.01); *B29K 2023/22* (2013.01)

(58) Field of Classification Search
CPC ...... F21S 48/1208; F21V 17/00; F21V 15/01; F21V 15/015

USPC .......................................... 362/374–377, 457
See application file for complete search history.

(56) References Cited

U.S. PATENT DOCUMENTS

| | | | | |
|---|---|---|---|---|
| 3,297,864 | A * | 1/1967 | Waldbauer | 362/310 |
| 4,010,362 | A * | 3/1977 | Fletcher | 362/375 |
| 4,320,443 | A * | 3/1982 | Zwillich | 362/375 |
| 4,434,456 | A * | 2/1984 | Taylor | 362/374 |
| 5,024,404 | A * | 6/1991 | Ballard | 248/62 |
| 5,141,276 | A * | 8/1992 | McClure | 294/92 |
| 5,462,246 | A * | 10/1995 | Schlenker | 248/49 |
| 5,697,585 | A * | 12/1997 | Hungerford, Jr. | 248/74.3 |
| 6,283,611 | B1 * | 9/2001 | Sharrah et al. | 362/205 |
| 6,305,719 | B1 * | 10/2001 | Smith et al. | 285/15 |
| RE38,767 | E * | 8/2005 | Wedell et al. | 362/652 |
| 7,500,494 | B2 * | 3/2009 | Robinson et al. | 138/99 |

FOREIGN PATENT DOCUMENTS

CA           2087640           7/1994

* cited by examiner

*Primary Examiner* — Robert May
*Assistant Examiner* — Bryon T Gyllstrom

(57) ABSTRACT

A removable birdstop closure for preventing the entry of birds and other small animals into the headcasing of a roadway luminaire through the opening at the rear of the luminaire that can be installed around standardized 1.25" or 2.00" headpoles. Retaining means on the birdstop closure permits easy installation and removal.

7 Claims, 2 Drawing Sheets

LUMINAIRE BARRIER OR CLOSURE DEVICE

CROSS-REFERENCE TO RELATED APPLICATION

The present invention claims benefit of priority to U.S. provisional patent application Ser. No. 61/213,187 which was filed on May 15, 2009, and which is incorporated by reference as if fully recited herein.

FIELD OF THE INVENTION

This invention relates to a closure device for a roadway luminaire to prevent the entry of animals, birds or insects.

BACKGROUND OF THE INVENTION

A common problem with roadway luminaires is the tendency of birds, squirrels and other small animals and insects to nest or otherwise enter inside the headcasing. The main point of entry into the headcasing is through the pre-existing annular-like opening between the headcasing and the headpole at the rear of the luminaire.

For example, squirrels may eat the insulation coating on the wires, birds may be electrocuted and die, and birds' nests may catch fire. These problems require additional maintenance to be performed and parts replacement which is costly. Nest fires may necessitate the dispatch of fire, police and service crews to deal with the resultant luminaire fire.

One approach to dealing with these problems involves the installation of a barrier device internally to the luminaire such that it forms an integral part of the luminaire, as disclosed in "Luminaire Shield Device" (U.S. Pat. No. 4,010,362) and "Fauna Guard" (U.S. Pat. No. 4,320,443). However, a drawback to this approach is that the installation of the barrier requires the disassembly of the luminaire, or in some cases, the removal of the luminaire from the headpole altogether. In practice, this labour requirement often results in maintenance workers choosing not to install the device at all, which omission cannot be ascertained by visual inspection of the luminaire from the ground.

A further drawback is that these barrier devices cannot be used to completely close off the opening due to the necessity of allowing for ±5 degrees of headcasing adjustment. This adjustment is necessary to provide for optimal lighting patterns on the roadway below and the resultant gap, notwithstanding the barrier, gives access to the luminaire.

Another approach has been to install a barrier device externally to the luminaire, as disclosed in "Luminaire Birdshield" (U.S. Pat. No. 4,434,456) and "Streetlight Light Lifetime Saver/Anti-Pollution Device" (CA Application 2,087,640), such that it may be fitted and replaced without the need to disassemble the luminaire or remove it from the headpole. Drawbacks to this device includes the physical manipulation required to install them which cannot be effectively accomplished while wearing protective gloves. As well, exposure to the elements and/or animal pecking and clawing activity, may dislodge these devices.

SUMMARY OF THE INVENTION

One object of the present invention is to provide a durable birdstop closure that is easy to install on a variety of roadway luminaires. The birdstop closure according to this invention is capable of external installation without the need to remove or adjust the headcasing. The birdstop closure may be installed wearing Class 0-4 rubber gloves. Removal of the birdstop closure is easily accomplished using pliers or any other grasping device that complies with the applicable safety guidelines for maintenance workers.

According to another aspect of the invention, a bird stop is provided for a standardized annual aperture at the rear of a luminaire at the point of entry of a pipe conduit. The closure has a generally annular body having a thickness, inner abutment surface and an inner diameter substantially equal to the outer diameter of the pipe. A bifurcation at a point along the periphery of the body enables the closure to be split opened for placement around the pipe. A retaining means across the bifurcation secures the closure in situ around the pipe.

According to another aspect of the invention, the retaining means has a hinged bottom flap to permit the opening of the luminaire without dislodging the closure.

According to another aspect of the invention, the closure has a removable concentric-like portion which increases the inner diameter of the closure to enable it to be installed around a larger diameter pipe.

According to another aspect of the invention, the peripheral edge of the closure is a lap joint to permit a closer fit within the annular luminaire opening. A grasping tab on the retaining means is provided to facilitate its removal from the closure.

According to another aspect of the invention is to allow for visual inspection from the ground to determine that the birdstop closure has been installed.

The birdstop closure according to the present invention comprises a flexible and resilient moulded material is adapted to selectively fit circumferentially around 1.25" and/or 2.00" diameter headpoles. Installation involves placing the birdstop closure around the headpole so that the birdstop closure abuts the headcasing. Once positioned, the birdstop closure is secured in place using the retaining means.

The external location of the birdstop closure to the headcasing and the hinged flap on the retaining means permits the opening of the headcasing for maintenance such as for changing the light bulb.

DESCRIPTION OF THE DRAWINGS

In order that the invention may be more clearly understood, a preferred embodiment thereof will now be described in detail by way of example, with reference to the accompanying drawings, in which.

DESCRIPTION OF THE PREFERRED EMBODIMENTS

A birdstop barrier or closure according to the present invention is illustrated in the Figures. Preferably the closure is moulded from a resilient yet flexible type of rubber such as, by way of example, "DSM Sarlink 4180", that remains pliable in sub-zero weather and will not degrade or break down in higher temperatures.

Figure 1:
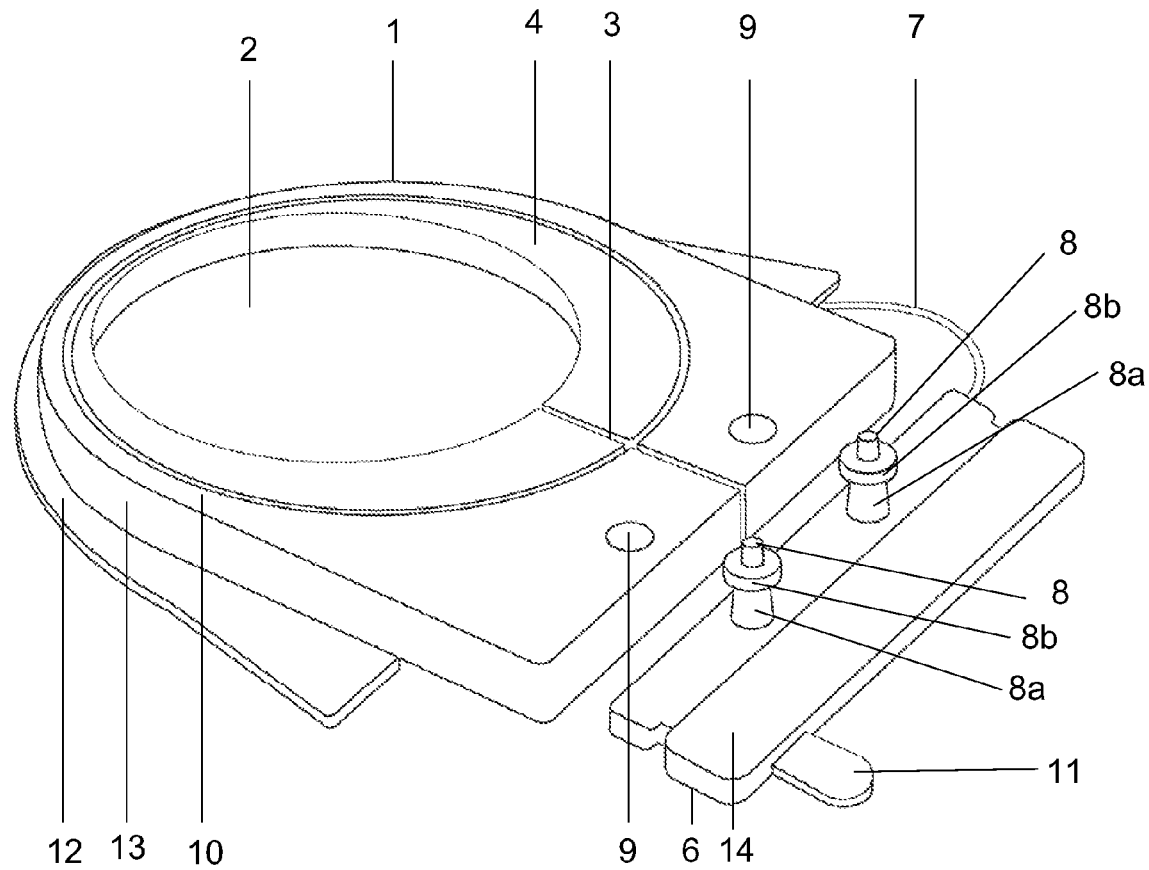
FIG. 1 is a perspective view of the closure according to the present invention.
Figure 2:
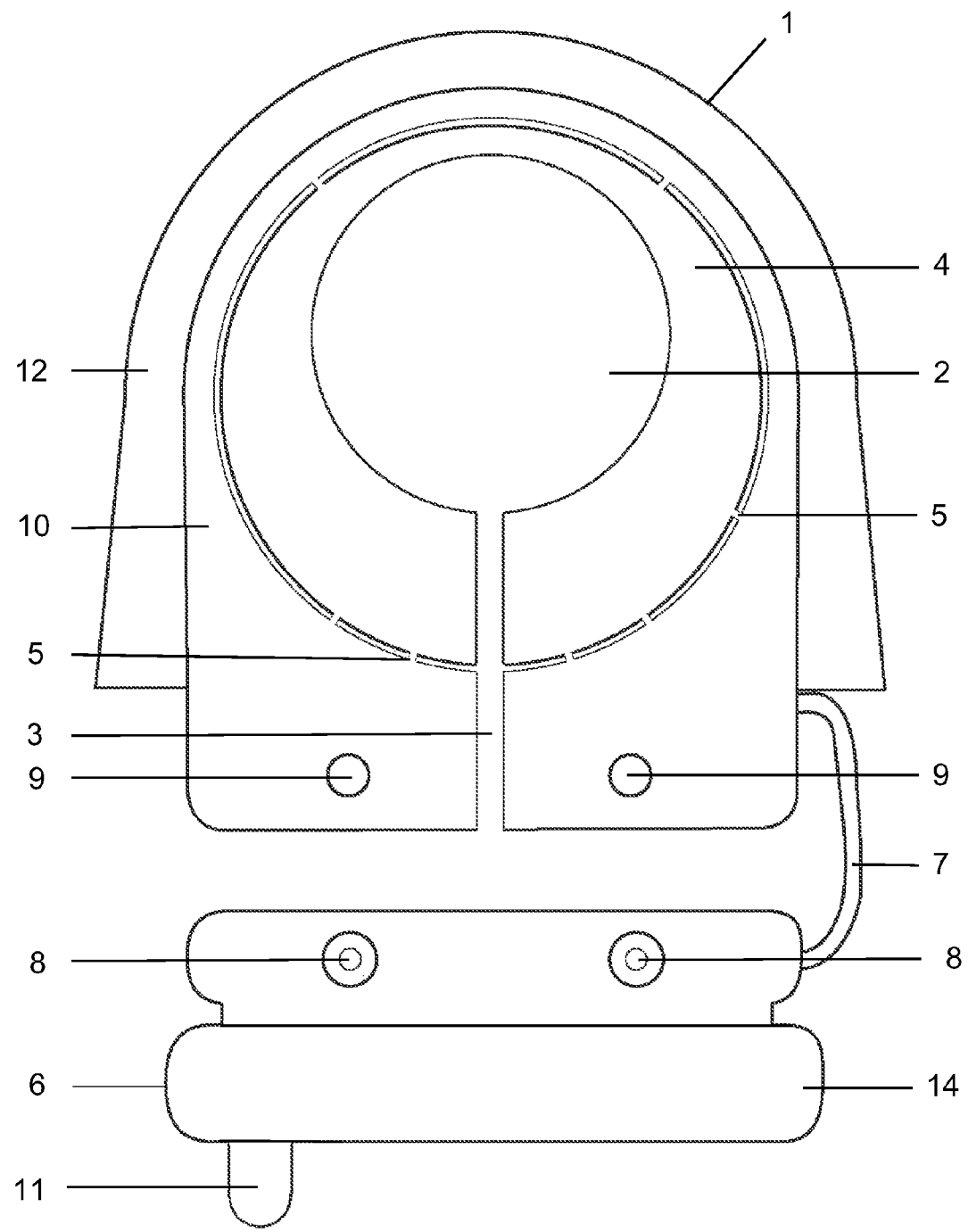
FIG. 2 is a plan view of the birdstop closure of FIG. 1.

As shown in FIGS. 1 and 2, the closure has a generally annular body 1 having a central opening 2. The body has a bifurcation 3 at a point along the periphery of the body 1 to allow the split opening thereof for installation around the circular headpole pipe without the disassembly of the luminaire. The diameter of the central opening 2 of the birdstop closure is identically sized to fit a standard 1.25" diameter headpole. The closure is preferably installed around the headpole by way of a tight frictional fit.

The closure according to the present invention is adapted to be used with a standard 2" diameter headpole as well. To this end a concentric-like removable ring 4 is provided immediately adjacent and outward of the 1.25" diameter central circular opening. The ring is held in place by connecting strips 5 formed during the moulding process and can easily be removed by the installer to fit a standard 2" diameter headpole.

A retaining means 6 is provided to secure the closure in place around the headpole. The retaining means 6, is attached to the birdstop closure by a leash 7, and is provided with two outwardly protruding tabs 8. During installation of the birdstop closure, the tabs 8 are aligned with and made to engage the spaced apart holes 9 on either side of the birdstop closure. The tabs 8 consist of a first portion 8a and a flange portion 8b of larger diameter. The first portion 8a is of a length equal to the thickness of the birdstop closure and is tapered at the end to accommodate insertion thereof into the complementary preferably tapered holes 9 provided in the birdstop closure. During insertion of the tabs, the flange section 8b is compressed within the tapered hole 9 but expands outwardly once it exits the opposite end of the hole to thus secure the open ends of the birdstop closure to one another and around the headpole pipe.

A grasping flap 11 is provided on the retaining means 6 of the birdstop closure which can be grasped and manipulated by the installer by means of pliers to facilitate the disengagement of the retainer from the body 1 and permit removal of the birdstop closure.

To fully install the closure, it is urged into position toward the headpole. The outside dimensions of the closure are sized larger than the luminaire opening and the inside surface 10 of the closure body abuts the outer surface of the headcasing to thereby substantially close the opening. Preferably the closure is provided with a lap joint 12 around the inner periphery to enable a closer fit. The inner edge 13 of the lap joint fits inside the luminaire opening and the lap overlies the outer edge of the opening for a closer fit.

As shown in FIG. 3, the retaining means also includes a hinged flap portion 14 that is hingedly connected to the retaining means at the bottom. The purpose of the hinged flap is to cover any remaining opening at the bottom between the birdstop closure and the headcasing when the birdstop closure is installed. The hinge feature allows the hinged flap portion to yield as required when the headcasing of the luminaire is opened for maintenance. Otherwise the closure would be dislodged or damaged during such maintenance.

Further advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A birdstop closure for closing an aperture at the point of entry of a pipe into an opening in the rear of a luminaire headcasing, wherein the aperture has a generally annular planar shape defined by the outer surface of the pipe and the inner edge of the opening in the rear of the luminaire headcasing, the closure comprising
    a generally annular body shaped complementary to the generally annular planar shape to cover and fit within the aperture, having a thickness, an outer periphery shaped complementary to the inner edge of the opening in the rear of the luminaire headcasing, and an inner periphery shaped complementary to the outer surface of the pipe;
    a bifurcation at a point along the inner and outer periphery of the body to enable the split opening thereof for placement thereof in abutting circumscribing relationship around the pipe;
    an abutment surface extending outwardly from the outer periphery of the body for abutment against the luminaire headcasing adjacent the aperture; and
    a retainer mechanism across the bifurcation for securement of the closure in situ around the pipe.

2. A birdstop closure as defined in claim 1, wherein the retainer mechanism has a first top portion for securement aforesaid and a second bottom hinged flap portion.

3. A birdstop closure as defined in claim 1, wherein the generally annular body has a concentric-like removable portion, which may be removed to thereby increase the diameter of the inner periphery.

4. A birdstop closure as defined in claim 1, wherein the retained mechanism has a grasping tab.

5. A birdstop closure as defined in claim 1, wherein the retainer mechanism is attached to the body by means of a leash.

6. A birdstop closure as defined in claim 5, wherein the closure is moulded from resilient flexible material.

7. A birdstop closure as defined in claim 5 wherein the closure is moulded from thermoplastic vulcanizate material.

* * * * *